Patented May 2, 1939

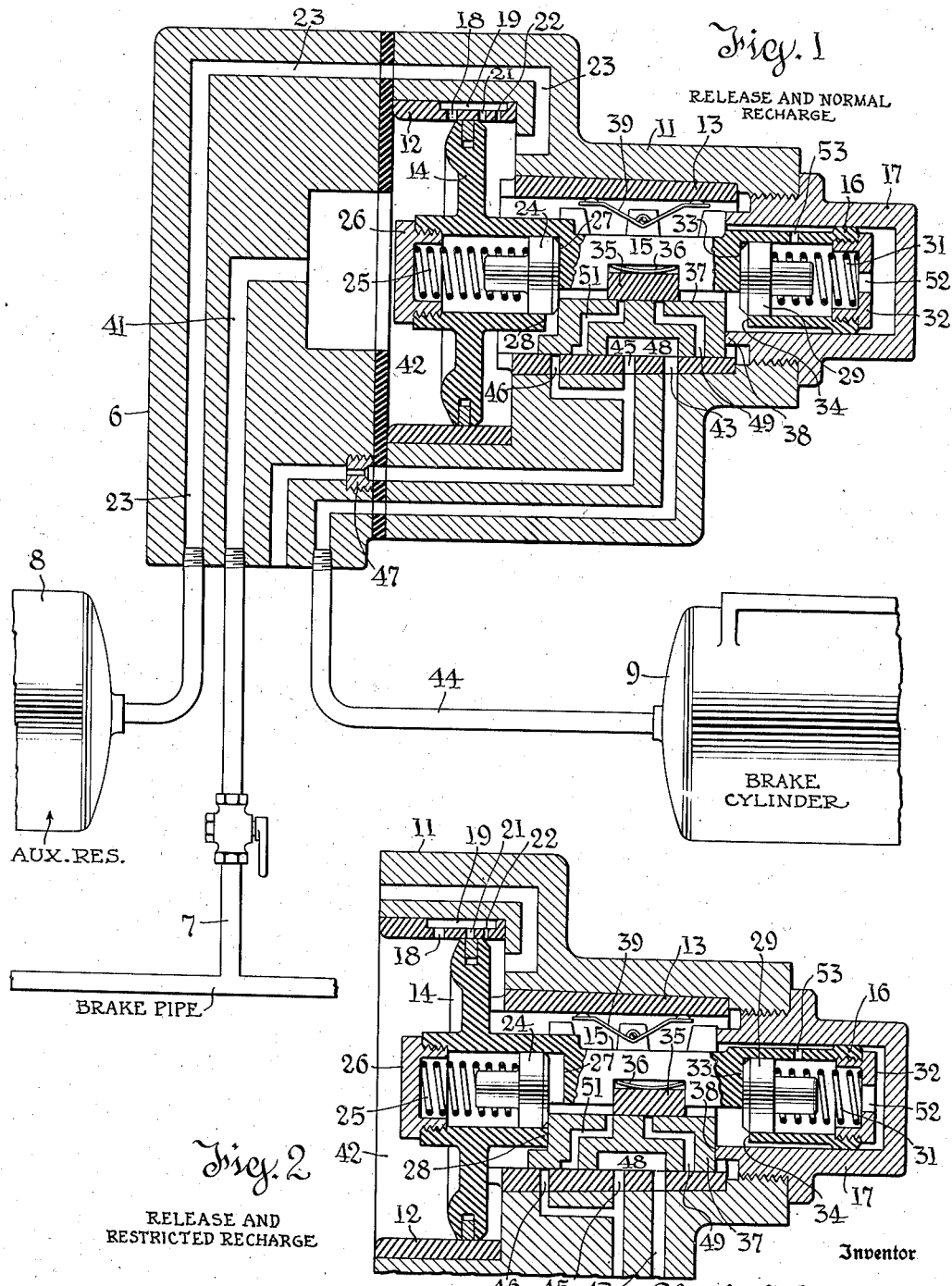

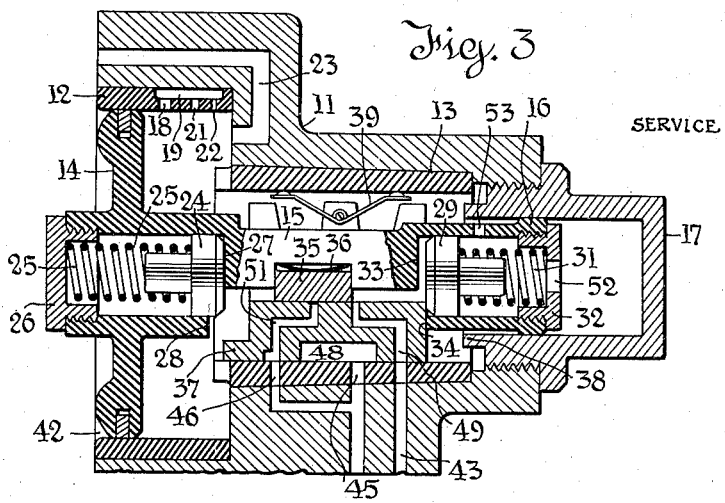
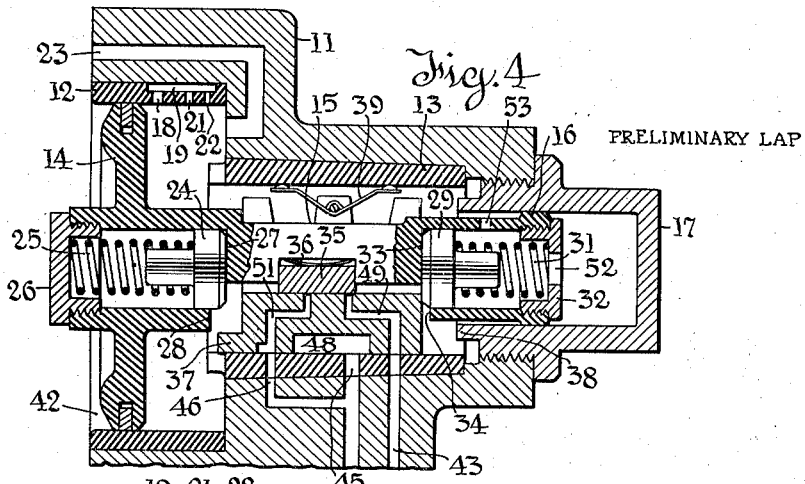
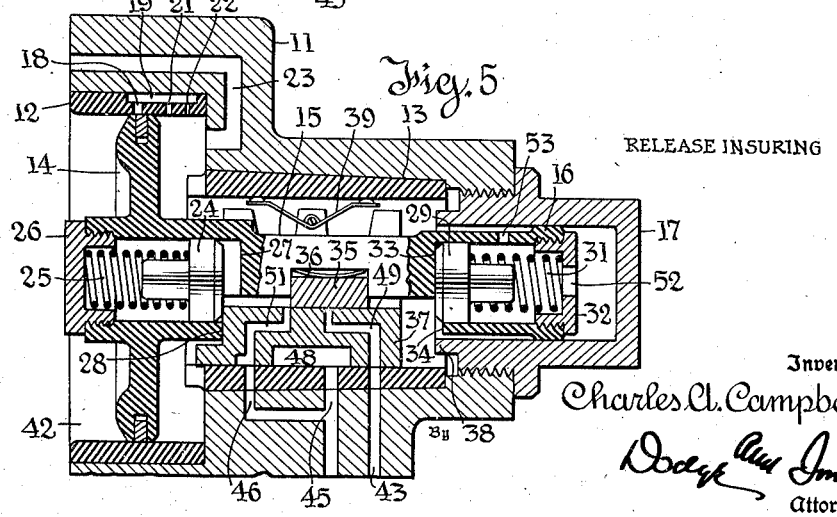

2,156,720

UNITED STATES PATENT OFFICE 2,156,720

AIR BRAKE

Charles A. Campbell, Watertown, N. Y., assignor to The New York Air Brake Company, a corporation of New Jersey Application May 24, 1938, Serial No. 209,793

7 Claims. (Cl. 303—36)

This invention relates to air brakes and particularly to triple valves. The object of the invention is to provide a comparatively simple form of triple valve having desirable operating characteristics both as to a preliminary service lap movement and as to release-insuring and slide valve unloading functions.

Another valuable feature is the use of a spring stop, which is provided primarily to control the release-insuring function, as a retard stop to resist motion from normal release to restricted release position.

While the invention is capable of embodiment in more complicated forms of triple valve, for example in the service portion of the AB valve, it will be described as embodied in a relatively simple triple valve so that only essential functions, particularly those relating to the invention here under consideration, need be discussed.

In the drawings:

Figure 1 shows a triple valve embodying the invention in axial section, and includes the connections to the auxiliary reservoir brake pipe and brake cylinder. The valve is shown in release and normal recharge position.

Fig. 2 is a fragmentary view of the triple valve in release and restricted recharge position.

Fig. 3 is a similar view of the valve in service position.

Fig. 4 is a similar view of the valve in preliminary lap position; and

Fig. 5 is a similar view of the valve in release-insuring position.

In the drawings 6 represents a pipe bracket to which are connected the brake pipe 7, an auxiliary reservoir 8 and the brake cylinder 9 as clearly indicated in the drawings.

Attached to pipe bracket 6 is the body 11 of the triple valve, and this houses a cylinder with a cylinder bushing 12 and a valve chamber with a valve chamber bushing 13. Working in the bushing 12 is a triple piston 14 whose stem 15 extends into the valve chamber and is guided at its inner end by a flange 16 which slides in the cup-shaped cap 17.

The piston 14 in the normal recharge position of Fig. 1 exposes a charging port 18. This leads to a passage 19 which communicates with two ports 21 and 22 which, in normal recharge position, communicate with the space to the right of the piston 14 and consequently with the slide valve chamber, and with the auxiliary reservoir 8, connected to the slide valve chamber by way of the passage 23. When the piston moves into restricted recharge position (Fig. 2) the piston blanks the port 21 so that the charging rate is reduced to the capacity of the smaller port 22.

The stem of the piston houses at its opposite ends two opposed spring plungers. One of these, 24, is guided in a chamber formed in what might be described as the hub of piston 14. It is urged inward, that is away from the brake pipe side of the piston 14, by a coil compression spring 25. The spring is held under proper initial stress by a combined plug and spring seat 26 threaded into the center of the piston. Movement of the plunger 24 under the urge of the spring 25 is limited by the face 27, and when against that face the forward end of the plunger 24 stands in advance of the shoulder 28 formed on the lower portion of the piston hub.

The other plunger 29, mounted in the end of the stem 15, is urged toward the piston by coil compression spring 31 which is retained by combined plug and spring seat 32 threaded into the end of the piston rod 15. The motion of the plunger 29 under the urge of spring 31 is limited by the face 33 and in this position the end of plunger 29 stands in advance of the shoulder 34 formed on the lower portion of stem 15.

Mounted in a notch in the stem 15, near its mid-length so as to have no appreciable lost motion relatively to the stem, is the graduating valve 35 which is urged by a bow spring 36 into seating engagement with the top of the main slide valve 37. This main slide valve works on a ported seat in the bushing 13. The slide valve is formed with upwardly extending wings to carry the bow spring 39 which holds it to its seat.

The main slide valve is capable of lost motion relatively to the piston 14 and its stem 15. This lost motion is positively limited by the shoulders 28 and 34 hereinbefore mentioned. It is more closely limited in each direction by the plungers 24 and 29 when these are seated against the faces 27 and 33. If the springs reacting against plungers 24 and 29 are overpowered, the full lost motion can occur. The parts are so dimensioned that when the slide valve moves to either release position (Fig. 1 or 2) its inward motion is arrested by the end 38 of the cap member 17.

The connection of the auxiliary reservoir to the slide valve chamber has been explained. The brake pipe is connected by the passage 41 to the space 42 on the outer side of the triple piston 14. The brake cylinder port 43 in the seat of slide valve 37 is connected to the brake cylinder by a pipe 44. The exhaust port 45 in the slide valve seat has a branch 46 also terminating in the slide valve seat, and these ports communicate to atmosphere through a flow restricting choke 47, whose purpose will be hereinafter more fully explained.

The slide valve 37 has a cavity 48 which connects the ports 43 and 45 in the release position. It should be observed that since the end 38 of the cap 17 determines release position, the position of the slide valve 37 is the same in both Figs. 1 and 2.

There are two passages extending from top to bottom of slide valve 37, both of which are controlled by the graduating valve 35. The first of these is the service port 49. This port is blanked at the slide valve seat in release position, and registers with the brake cylinder port 43 in service, preliminary lap and release-insuring positions (Figs. 3, 4 and 5). The second through port is the release-insuring port 51 which is blanked at the slide valve seat in both release positions (Figs. 1 and 2) and which registers with the extension exhaust port 46 in service, preliminary lap and release-insuring positions (Figs. 3, 4 and 5).

As stated, the upper ends of these two ports 49 and 51 are controlled by the graduating valve 35. In release and normal recharge position (Fig. 1) the graduating valve blanks both ports, but this is without functional significance because both ports are then blanked at the seat of the main slide valve. In release and restricted recharge position (Fig. 2), these ports are also blanked at the slide valve seat, so the fact that the graduating valve exposes the upper end of port 51 in this last-named position is also without functional significance.

In service position (Fig. 3) the graduating valve exposes the service port 49 which then registers with the brake cylinder seat port 43, so that auxiliary reservoir air flows through the ports 49 and 43 to the brake cylinder.

In Fig. 4, which is a preliminary service lap position, the graduating valve 35 is shown as closing the port 51 and just lapping the port 49 so that the graduating valve has just lapped service flow.

In the release-insuring position of Fig. 5, the graduating valve laps the service port 49 and fully exposes the release-insuring port 51 which is then in communication with the branch exhaust port 46, so that air is vented from the slide valve chamber to atmosphere but at a rate limited by the choke 47.

The openings 52, 53 are provided to vent the space to the right of the flange 16 so that it will not exercise a compression or piston action in the cap 17.

The operation can now be explained.

*Operation*

In initial charging, air from the brake pipe 7 flows from the chamber 42 through the port 18 and thence in parallel through the ports 21 and 22 to the slide valve chamber.

In release and normal recharge position the slide valve has been moved to the right until arrested by the end 38 of the cap 17. The exhaust cavity 48 connects the brake cylinder port 43 with the exhaust port 45 so that the brake cylinder is connected to atmosphere. The spring 25 is not compressed and it will be observed that the plunger 24 and spring 25 serve as a retard stop to arrest the piston 14 in normal charging position.

During release the triple valves on the cars in the forward portion of the train will be moved by the rapid rise of brake pipe pressure to restricted recharge position (Fig. 2). As shown in Fig. 1 the slide valve 37 is arrested by the end 38 and the cap 17, and hence can move no farther to the right. Thus, if brake pipe pressure rises sharply, as it does at the forward end of the train, the piston moves inward overpowering spring 25 by reaction of the slide valve 37 against the plunger 24. When the sharp rise of brake pipe pressure fades out the spring will restore the triple piston and the graduating valve to the normal position of Fig. 1. Although the graduating valve then exposes the release-insuring port 51 in Fig. 2, no flow occurs since the port 51 is blanked.

In response to reduction of brake pipe pressure, the triple piston is moved out by dominant auxiliary reservoir pressure, the plunger 29 engages the slide valve 37 and overpowers the spring 31 until shoulder 34 on the stem engages the slide valve, then the slide valve and the piston stem 15 move as a unit until the service port 49 registers with the brake cylinder port 43. This connects the auxiliary reservoir with the brake cylinder and this connection will be maintained until auxiliary reservoir pressure falls nearly to equalization of brake pipe pressure, at which time the spring 31 will assist in shifting the piston 14 and graduating valve 35 to preliminary lap position (Fig. 4).

In this preliminary lap position the port 49 is just closed by the graduating valve, and the action of spring 31 has been terminated because plunger 29 is against face 33 and can move no farther. Subsequent brake pipe pressure reductions entail compression of the spring 31 to permit the graduating valve to expose the service port.

In the releasing movement, the triple piston 14 and graduating valve 35 will move inward independently of the slide valve, at least until plunger 24 engages the slide valve. If the slide valve then sticks, as it may do, the piston will continue its inward motion overpowering spring 25 until shoulder 28 on the valve approaches contact with the slide valve. At such time the release-insuring port 51 connects the slide valve chamber with the branch exhaust port 46 and also with the exhaust cavity 48. Choke 47 limits the flow rate to atmosphere and since the cavity 48 has considerable area the slide valve 37 is partly unloaded so that its frictional resistance to motion is reduced just as slide valve chamber pressure is reduced. The effect of these two actions is to insure prompt movement of the triple piston 14 and slide valve 37 to release and recharge position (Fig. 1).

From the construction above described it is obvious that this plunger 29 with its spring assists graduation and particularly lapping motion. The plunger 24 with its spring 25 not only serves as a retard stop in the motion between normal and restricted recharge position, but also controls the action of the graduating valve in opening the release-insuring port. The release-insuring action involves not merely the venting of the slide valve chamber, but in addition thereto involves the reduction of the loading differential on the slide valve and the consequent relief of frictional resistance between the slide valve and its seat.

While one embodiment has been described in considerable detail, the invention is not limited to this particular construction which is intended as exemplary.

What is claimed is:

1. A brake controlling valve device for automatic brakes, comprising in combination a body adapted for connection with brake pipe, brake cylinder and auxiliary reservoir; a piston responsive to pressure differentials between brake pipe and auxiliary reservoir; a slide valve mounted on a seat in the body and shiftable thereon by the piston but having lost motion relatively to the piston; a graduating valve shiftable by the piston relatively to the slide valve; and yielding means resisting relative motion of the piston and slide valve through at least the terminal portions of the lost motion in each direction, the slide valve seat having a brake cylinder port and an exhaust port and the slide valve having an application port and a release-insuring port which respectively register with said brake cylinder port and the exhaust port in application position of the slide valve, said slide valve ports being lapped by the graduating valve when in its mid-position, and opened selectively upon the overpowering of said yielding means in opposite directions.

2. A brake controlling valve device for automatic brakes, comprising in combination a body adapted for connection with brake pipe, brake cylinder and auxiliary reservoir; a piston responsive to pressure differentials between brake pipe and auxiliary reservoir, said piston controlling charging flow from the brake pipe to the auxiliary reservoir and having a normal charging position and an inner charging position in which the charging flow is restricted; a slide valve mounted on a seat in the body and shiftable thereon by the piston but having lost motion relatively to the piston; means for arresting said slide valve in release position; a graduating valve shiftable by the piston relatively to the slide valve; and yielding means resisting relative motion of the piston and slide valve through at least the terminal portions of the lost motion in each direction, the slide valve seat having a brake cylinder port and an exhaust port and the slide valve having an application port and a release-insuring port which respectively register with said brake cylinder port and the exhaust port in application position of the slide valve, said slide valve ports being lapped by the graduating valve when in its mid-position, and opened selectively upon the overpowering of said yielding means in opposite directions, said yielding means serving to resist motion of said piston to the charge restricting position when the slide valve is arrested in release position.

3. The combination defined in claim 1, in which the yielding means comprises a pair of spring-urged plungers mounted in the piston stem in opposed relation to each other and each limited in its motion toward the other so that the slide valve has an intermediate range of free lost motion relative to the piston, and a further limited range of lost motion against spring resistance in each direction.

4. The combination defined in claim 2, in which the yielding means comprises a pair of spring-urged plungers mounted in the piston stem in opposed relation to each other and each limited in its motion toward the other so that the slide valve has an intermediate range of free lost motion relative to the piston, and a further limited range of lost motion against spring resistance in each direction.

5. The combination defined in claim 1, in which the exhaust port in the seat communicates with a cavity in the seated face of the slide valve when the latter is in its application position and is restricted beyond such communication, whereby in its application position the slide valve is partially unloaded when the graduating valve exposes said release-insuring port.

6. The combination of a brake controlling valve device, including a piston and a slide valve shiftable thereby, and including release-insuring means rendered effective by releasing motion of the piston relatively to the slide valve, to vent pressure fluid from the space above the slide valve; of means for restricting such venting flow and causing back pressure developed by such restriction to react on the seated face of the slide valve to unload the same at least partially, whereby the releasing movement of the slide valve is facilitated.

7. The combination with a triple valve, including a piston and a slide valve actuated by said piston and mounted in a chamber subject to fluid pressure; of release-insuring valve means, rendered effective by the sticking of the slide valve during releasing functions, to vent pressure fluid from said valve chamber; and means for developing back pressure in the vented fluid and causing said back pressure to react upon the seated face of the valve to unload the same.

CHARLES A. CAMPBELL.